US006991546B2

(12) United States Patent
Rücker

(10) Patent No.: US 6,991,546 B2
(45) Date of Patent: Jan. 31, 2006

(54) UNIVERSAL JOINT SHAFT

(75) Inventor: Andreas Rücker, Mülheim (DE)

(73) Assignee: Spicer Gelenkwellenbau GmbH & Co. KG, Essen (DE)

( * ) Notice: Subject to any disclaimer, the term of this patent is extended or adjusted under 35 U.S.C. 154(b) by 40 days.

(21) Appl. No.: 10/649,526

(22) Filed: Aug. 27, 2003

(65) Prior Publication Data

US 2004/0092319 A1 May 13, 2004

(30) Foreign Application Priority Data

Aug. 27, 2002 (DE) ................................. 102 40 009

(51) Int. Cl.
*F16D 3/06* (2006.01)
(52) U.S. Cl. ..................... 464/169; 403/361; 403/368; 464/182
(58) Field of Classification Search ................ 464/134, 464/169, 182, 901; 403/361, 368, 367, 383; 72/249; 492/15; 279/32
See application file for complete search history.

(56) References Cited

U.S. PATENT DOCUMENTS

| 890,091 A | * | 6/1908 | Parmeter ................. 403/368 X |
| 2,329,601 A | * | 9/1943 | Frye .......................... 464/162 |
| 3,020,735 A |   | 2/1962 | Wegmann |
| 4,094,179 A |   | 6/1978 | Okuda |
| 4,305,678 A | * | 12/1981 | Majoor ....................... 403/361 |
| 4,560,300 A | * | 12/1985 | Vollmer et al. .......... 464/169 X |
| 4,939,919 A | * | 7/1990 | Chezzi ...................... 72/249 X |
| 5,674,024 A | * | 10/1997 | Daumal Castellon ....... 464/901 |
| 6,082,294 A |   | 7/2000 | Simpson |

FOREIGN PATENT DOCUMENTS

| DE | 3231752 | 12/1983 |
| DE | 3714217 | 11/1988 |
| DE | 279424 | 1/1989 |
| DE | 7723574 U | 9/1990 |
| DE | 19748450 | 5/1999 |
| DE | 202 13 190 | 2/2003 |
| WO | WO2004/018887 A1 | * 3/2004 |

* cited by examiner

Primary Examiner—Greg Binda
(74) Attorney, Agent, or Firm—MacMillan, Sobanski & Todd, LLC

(57) ABSTRACT

A universal joint shaft for driving a roll of a rolling mill includes a connecting shaft, a first universal joint that is attached to a first end of the connecting shaft, a second universal joint that is attached to a second end of the connecting shaft, a coupling sleeve that includes a longitudinal axis that is connected to the first universal joint, which comprises a receiving bore with an opening for receiving a journal of a roll, wherein the receiving bore forms torque transmitting transmission faces, and which includes a first conical face that is arranged concentrically relative to the longitudinal axis, wherein the first conical face is provided for contacting a correspondingly designed first counter face at the journal of the roll, as well as a structure means by which the first conical face is loaded along the longitudinal axis towards the roll.

9 Claims, 12 Drawing Sheets

UNIVERSAL JOINT SHAFT

BACKGROUND OF THE INVENTION

The invention relates to a universal joint shaft for driving a roll of a rolling mill. The universal joint shaft includes two universal joints, one of which is releasably connected to the shaft in order to permit the roll to be removed easily. For this purpose, the universal joint shaft includes a coupling sleeve that can be slid onto a journal of a roll. To permit assembly, the coupling sleeve is positioned on the journal with a small amount of play.

However, there exists a problem in that due to the weight of the universal joint shaft, the longitudinal axis of the coupling sleeve tilts relatively to the longitudinal axis of the journal, thus generating out-of-balance conditions. In particular, this problem occurs if there is a long distance between the coupling sleeve and the universal joint connected to the coupling sleeve. As a result, there occurs a long cantilever arm, such as shown in the drive assembly of German Patent Application No. 197 48 450 C2, wherein two rolls are arranged one above the other, with each being driven by a universal joint shaft. As the radial distance between the rolls is very small, the universal joint shafts are designed in such a way that the universal joints of the two universal joint shafts are arranged so as to be axially offset relative to one another. The universal joint of the one universal joint shaft is thus closer to the coupling sleeve than the universal joint of the other universal joint shaft. As the distance between the coupling sleeve and the joint center of the latter universal joint shaft is relatively long, a certain play between the coupling sleeve and the roll journal has a particularly adverse effect due to the long cantilever arm.

In order to compensate any play in the connection between the universal joint shaft and the roll journal, German Patent Application No. 37 14 217 C2 describes a roll journal which is prism-shaped and which is tapered towards its free end. The roll journal includes three torque transmitting faces that are arranged around a longitudinal axis and that enclose an angle towards the longitudinal axes. The coupling sleeve of the universal joint shaft includes transmitting elements that contact the torque transmitting faces and that, away from the journal, include partially circular faces that engage correspondingly designed recesses of the coupling sleeve. Because of their spherical shape, the transmitting elements are able to compensate for angular deviations between the longitudinal axis of the coupling sleeve and the longitudinal axis of the roll journal. Because of the prism-shaped design of the roll journal, play is compensated due to the coupling sleeve being loaded towards the roll journal.

German Patent Application No. 32 31 752 C1 shows a further embodiment of a coupling between a universal joint shaft and a roll journal. In this embodiment, the roll includes torque transmitting faces. The coupling sleeve of the universal joint shaft includes contact faces that enclose an angle relative to the longitudinal axis and that are open towards the roll. Between the torque transmitting faces and the contact faces, there are positioned wedge-shaped transmitting parts that are axially loaded by springs towards the driveshaft. These transmitting parts slide axially along the contact faces and move radially towards the longitudinal axis. Play between the coupling sleeve and the roll journal is thus avoided. However, the disadvantage of both designs is that the compensation of play at the torque transmitting elements of the coupling takes place between the universal joint shaft and the roll journal. As a result, the elements for compensating play are subjected to high loads, so that they have to be dimensioned sufficiently.

German Patent Application No. 77 23 574 U1 describes a driving device for rolls of a rolling mill. The connecting shaft includes two joints, with one of the joints including a coupling sleeve that can be slid onto a journal of a roll. The coupling sleeve includes a receiving bore for receiving a journal and forms transmitting faces for transmitting torque between the coupling sleeve and the journal. In the receiving bore, there is provided a conical face in the form of a conical bore or a conical projection that comes into contact with a correspondingly designed face of the journal when the journal is received in the receiving bore. The journal is received in the receiving bore with a small amount of radial play so that the conical face serves to center the journal end. However, the disadvantage of the above design is that high radial forces can cause the journal to tilt within the receiving bore, thus generating an out-of-balance situation.

DD 279 424 A1 proposes a coupling wherein a centering journal can be received in a receiving bore of a coupling sleeve. At its end, the centering journal includes a cylindrical guiding journal and a cylindrical outer face arranged so as to be removed from the latter. The receiving means form a corresponding blind hole bore for receiving the guiding journal, as well as a bore in the region of the opening of the receiving bore for receiving the cylindrical outer face. In the receiving bore, following the bore for receiving the guiding journal, there is formed a conical bore that widens towards the opening of the receiving bore and by which the guiding journal is guided into the blind hole bore, even if the centering journal is in an inclined position. Consequently, the coupling sleeve, when being slid onto the centering journal, is displaced in such a way that both parts are aligned approximately co-axially relative to one another. Centering after assembly is ensured by the guiding journal and by the cylindrical outer face of the centering journal. However, the disadvantage in this case is that between the guiding journal and the blind hole bore, and, respectively, between the cylindrical outer face of the centering bore and the bore in the region of the opening of the receiving bore, there has to be provided a small amount of play so that the centering journal can be inserted fully into the receiving bore. There are, thus, generated slight tolerances that can lead to out-of-balance.

SUMMARY OF THE INVENTION

It is the object of the present invention to ensure that play can easily be compensated between the coupling sleeve of the universal joint shaft and a journal of a roll, with the play compensating components not taking part in the transmission of torque.

In accordance with the invention, the objective is achieved by providing a universal joint shaft for driving a roll of a rolling mill including a connecting shaft, a first universal joint that is attached to a first end of the connecting shaft, a second universal joint that is attached to a second end of the connecting shaft, and a coupling sleeve that defines a longitudinal axis and is connected to the first universal joint. The coupling shaft includes a receiving bore with an opening for receiving a journal of a roll, wherein the receiving bore forms transmitting faces for transmitting torque, that includes a cylindrical bore which is provided in the region of the opening and whose purpose it is to ensure that the journal is supported against the cylindrical bore by means of a correspondingly shaped cylindrical outer face, and that includes a first conical face that is arranged concentrically relative to the longitudinal axis and remote from the opening and that is provided for contacting a correspondingly designed first counter face at the journal of the roll in order to avoid a radial play, as well as means that loads the first conical face along the longitudinal axis towards the roll.

In this way, it is ensured that the transmitting faces and the first conical face represent separate faces, with the first conical face not taking part in a transmission of torque. The means by which the first conical face is loaded along the longitudinal axis towards the roll ensures that any radial play between the coupling sleeve and the journal of the roll is pressed out in that the first conical face is pressed deeper into the corresponding first counter face.

The first conical face is arranged at least partially on an imaginary cone and does not necessarily have to be closed around the longitudinal axis. It is quite possible to provide a plurality of first conical faces. However, in a preferred embodiment, the first conical face is represented by a closed face arranged around the longitudinal axis.

To be able to transmit torque, the coupling sleeve includes a cross-section that deviates from the shape of a circle. The receiving bore, for example, can include diametrically opposed, flattened regions.

The means by which the first conical face is loaded along the longitudinal axis toward the roll can be provided in the form of spring means that are arranged in a plunging unit of the connecting shaft, for example.

According to a first embodiment, the first conical face is formed in that there is provided a centering bore that starts from the receiving bore, that is arranged co-axially relative to the longitudinal axis, and that includes an inner face that conically widens towards the receiving bore and which is provided for contacting a correspondingly designed centering journal of the roll.

The centering bore can form part of a centering ring that is inserted into a cylindrical bore of the coupling sleeve. This means that merely an easily producible, cylindrical bore has to be provided in the coupling sleeve. The production of a conical inner face in the centering ring is easier because the centering ring is easier to handle during manufacture. Furthermore, if the centering ring is worn, it can be exchanged without the entire coupling sleeve having to be replaced.

The centering journal of the journal can also be provided with a cylindrical outer face, with a conical ring with a cylindrical bore and a conical outer face being positioned on the centering journal.

To ensure better radial support, the conical centering bore can be followed by a cylindrical bore that starts from the receiving bore and which contains a cylindrical projection at the centering journal.

According to a second embodiment, the first conical face is formed in that in the receiving bore, there is provided a truncated-cone-shaped centering projection that extends co-axially relative to the longitudinal axis, whose outer face is tapered toward the opening of the receiving bore and is provided for contacting a correspondingly designed inner face of a centering bore of the journal of the roll.

The centering projection can be connected to either the coupling sleeve or to a joint joke of the first universal joint.

There can be provided a spring means by which the centering projection can be loaded towards the journal. This constitutes a further embodiment of the means which loads the first conical face along the longitudinal axis towards the roll.

Furthermore, it is proposed for this purpose that the centering projection includes a base part that is fixed to the coupling sleeve or to the first universal joint and that includes a conical outer face for contacting the counter face and that the centering projection includes a centering part that, by means of spring means supported against the base part and the centering part, is loaded towards the journal and that includes a conical outer face for contacting the counter face.

Furthermore, the objective is achieved in accordance with the invention by providing a universal joint shaft for driving a roll of a rolling mill including a connecting shaft, a first universal joint that is attached to a first end of the connecting shaft, a second universal joint that is attached to a second end of the connecting shaft, a coupling sleeve that includes a longitudinal axis, that is connected to the first universal joint, that includes a receiving bore with an opening for receiving a journal of a roll, wherein the receiving bore forms transmitting faces for transmitting torque, that includes a first conical face that is arranged concentrically relative to the longitudinal axis and remote from the opening and which is provided for contacting a correspondingly designed first counter face at the journal of the roll in order to avoid a radial play, and that includes a second conical face that is provided in the region of the opening, that widens towards the opening, and which is provided for the purpose of contacting a second counter face of the journal, as well as means that loads the first conical face along the longitudinal axis towards the roll, wherein one of the two conical faces is loaded by spring means towards the respective counter face of the journal, and wherein the spring means are supported, on the one hand, against a component forming the respective conical face and, on the other hand, against the coupling sleeve.

The second conical face can be provided in the form of a ring that is inserted into the receiving bore in the region of the opening. This means that the ring can be exchanged when worn without the entire coupling sleeve having to be replaced.

To avoid any over-determining, one of the two conical faces is loaded by a spring means toward the respective counter face of the journal, with the spring means, on the one hand, being supported against a component forming the respective conical face and, on the other hand, against the coupling sleeve. It is thus ensured that both conical faces rest uniformly against the respective counter faces.

Furthermore, the objective is achieved in accordance with the invention by providing a universal joint shaft for driving a roll of a rolling mill, including a connecting shaft, a first universal joint that is attached to a first end of the connecting shaft, a second universal joint that is attached to a second end of the connecting shaft, a coupling sleeve that includes a longitudinal axis, that is connected to the first universal joint, that includes a receiving bore with an opening for receiving a journal of a roll, wherein the receiving bore forms transmitting faces for transmitting torque, that includes a first conical face that is arranged concentrically relative to the longitudinal axis, wherein the first conical face is provided for contacting a correspondingly designed first counter face at the journal of the roll in order to avoid a radial play, means that loads the first conical face along the longitudinal axis toward the roll, wherein the receiving bore, starting from the opening, is conically tapered toward the first universal joint and forms the first conical face.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
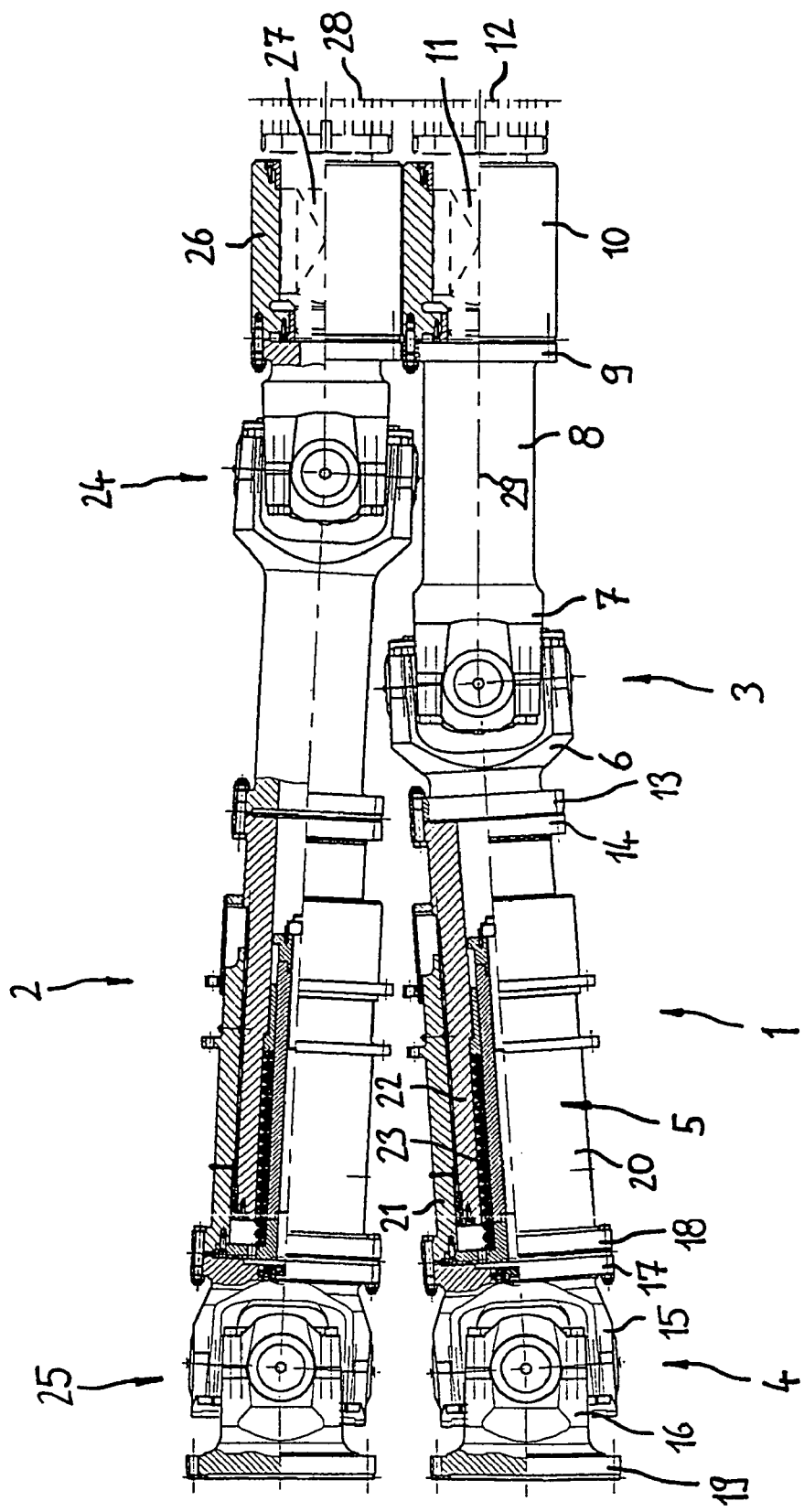
FIG. 1 is a side elevational view, partially in cross section, through two universal joint shafts in accordance with the invention.

FIG. 1 shows a first universal joint shaft 1 and a second universal joint shaft 2 that can be used, for example, for driving rolls of a rolling mill. The first universal joint shaft 1 includes a first universal joint 3 and a second universal joint 4 that are connected to one another by a connecting shaft 5. The first universal joint 3 includes a first joint yoke 6 and a second joint yoke 7. The second joint yoke 7 changes into a connecting pipe 8 whose end is provided with a flange 9. The flange 9 is connected to a coupling sleeve 10 that is positioned on a journal 11 of a roll 12 and is connected thereto in a rotationally fast way. The first joint yoke 6 of the first joint 3 includes a flange 13 that is connected to a flange 14 of the connecting shaft 5. The second universal joint 4 also includes a first joint yoke 15 and a second joint yoke 16, with the first joint yoke 15 being connected via a flange 17 to a flange 18 of the connecting shaft 5. The second joint yoke 16 also includes a flange 19 that serves to connect the second universal joint 4 to a driving unit (not shown).

The connecting shaft 5 includes a plunging unit 20 that is formed by a plunging sleeve 21 that is connected to the flange 18, by means of which the connecting shaft 5 is connected to the second joint 4. A plunging journal 22 is axially displaceably guided in the plunging sleeve 21. The plunging journal 22 is connected to the flange 14, which is provided for connecting the connecting shaft 5 to the first universal joint 3. A spring 23 is arranged inside the plunging unit 20 and is supported against the plunging sleeve 21 on the one hand and against the plunging journal 22 on the other hand and loads the plunging journal 22 to enable same to occupy a moved-out position. It is thus ensured that a pressure force is always applied to the first universal joint 3, and thus to the coupling sleeve 10, so that the coupling sleeve 10 is held firmly on the journal 11.

The second universal joint shaft 2 is designed so as to be comparable to the first universal joint shaft 1 and also includes a first universal joint 24 and a second universal joint 25. The first universal joint 24 is arranged at a shorter distance from a coupling sleeve 26 that is connected by a journal 27 to a further roll 28.

Inasmuch as the distance between the first universal joint 24 of the second universal joint shaft 2 is shorter than the distance between the first universal joint 3 of the first universal joint shaft 1 and the coupling sleeve 10, the two first universal joints 3, 24 are arranged so as to be axially offset relative to one another. This means that the universal joint shafts 1, 2 can be arranged so as to be radially closer to one another because the tube portions of the shafts 1, 2 occupy a smaller diameter than the first universal joints 3, 24. However, especially in the case of the first shaft 1, there exists a problem in that, due to the long cantilever arm resulting from the long distance between the first universal joint 3 and the coupling sleeve 10, there is generated an out-of-balance situation because there exists a radial play between the coupling sleeve 10 and the journal 11 in order to permit assembly. Due to the weight of the first universal joint shaft 1, the connecting pipe 8 may become tilted downwardly relative to a longitudinal axis 29 of the journal 11, so that the center of gravity is displaced.

To avoid such a situation, there are provided play compensating elements as described with reference to the following drawings.

Figure 2:
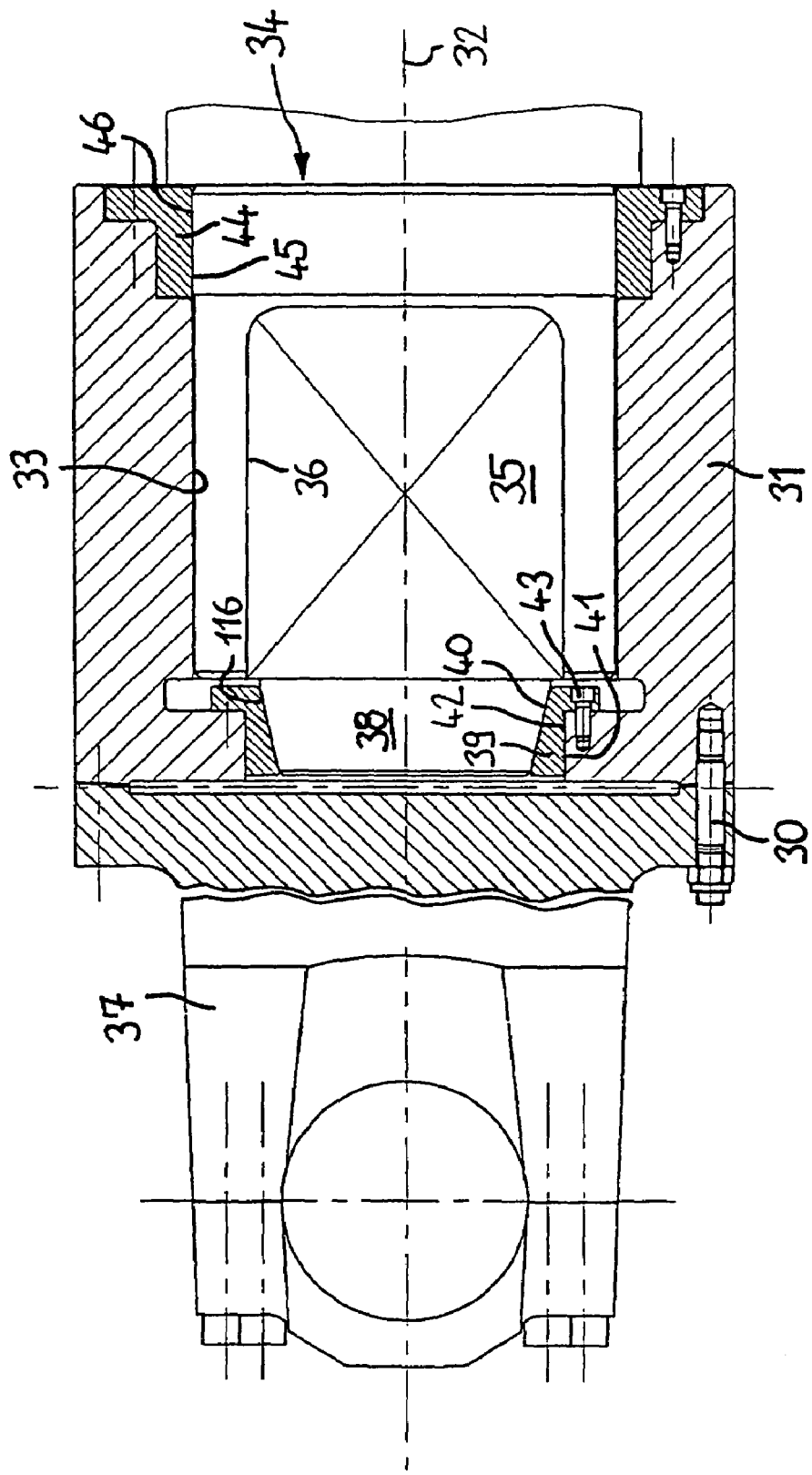
FIG. 2 is an enlarged sectional elevational view through a coupling sleeve of a first embodiment of a universal joint shaft having a conical centering journal at the roll journal.

FIG. 2 shows a longitudinal section through the connecting assembly between a first embodiment of the second joint yoke 37 of the first universal joint 3 and the roll 12. The second joint yoke 37 is connected by bolted connections 30 to a coupling sleeve 31 in a rotationally fast way. Around a longitudinal axis 32 of the coupling sleeve 31, there is provided a receiving bore 33 in the coupling sleeve 31, with the receiving bore 33 defining an opening 34 that faces away from the second joint yoke 37. A journal 35 of a roll is inserted through the opening 34 of the receiving bore 33. The journal 35 includes flattened regions 36 that contact correspondingly designed flattened regions in the receiving bore 33 and permit a transmission of torque because their cross-section deviates from the circular shape. Starting from the receiving bore 33, there is provided a bore 42 that is arranged co-axially relative to the longitudinal axis 32. A centering ring 39, including a first conical face 40 in the form of a conical inner face and a cylindrical outer face 41, is inserted into the bore 42. The first conical face 40 contacts a correspondingly designed first counter face 116 of a centering projection 38 at the free end of the journal 35. By means of its cylindrical outer face 41, the centering ring 39 is positioned in the bore 42 of the coupling sleeve 31 and is firmly connected via bolted connections 43 to the coupling sleeve 31.

In the region of the opening 34 of the receiving bore 33, a ring 44 is inserted into the receiving bore 33, which ring 44 includes a cylindrical bore 45 through which the journal 35 is guided and is radially supported by a cylindrical outer face 46. As shown in FIG. 2, the cylindrical bore 45 begins at the opening 34 of the receiving bore 33 and extends completely throughout the entire axial length of the ring 44. The ring 44 is secured by bolted connections 47 to the coupling sleeve 31. The journal 35 is thus supported at its free end via the centering projection 38 and at its end facing the roll via a cylindrical outer face 46 against the coupling sleeve 31, thus ensuring a defined support of the journal 35. Due to the pressure force of the spring 23 of the plunging unit 20 provided in the connecting shaft 5, a constant pressure is applied to the coupling sleeve 31 towards the roll so that the centering ring 39 is firmly pressed onto the centering projection 38. Radial play is thus avoided. It is thus ensured that the longitudinal axis of the journal 35 and the longitudinal axis 32 of the coupling sleeve 31 are positioned on one another as accurately as possible so that out-of-balance conditions cannot occur.

The following drawings show further embodiments, with any components corresponding to those in FIG. 2 being as described above in connection with FIG. 2.

Figure 3:
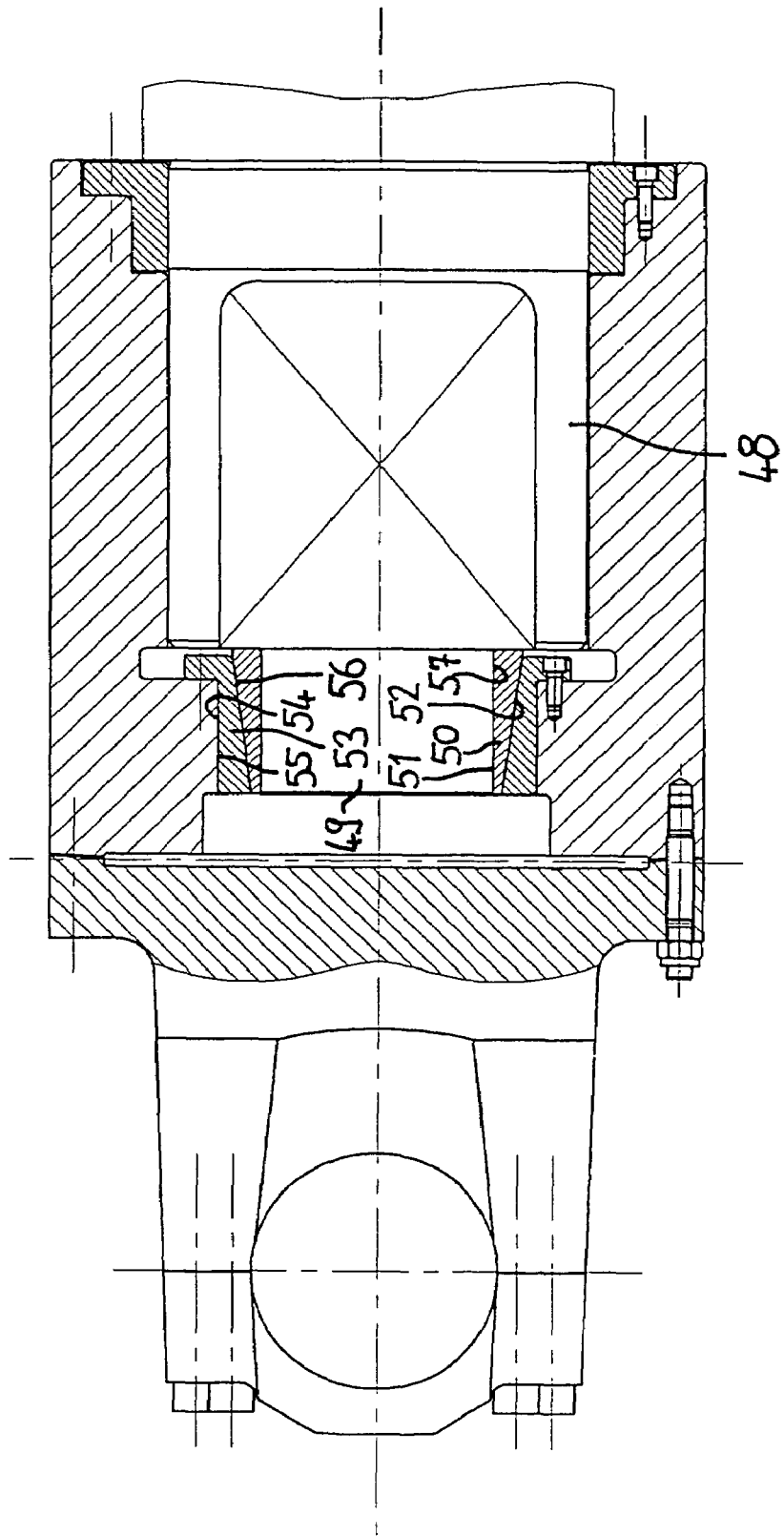
FIG. 3 is an enlarged sectional elevational view through a coupling sleeve similar to FIG. 2, wherein a conical ring is positioned on a centering journal of the roll journal.

FIG. 3 shows a coupling assembly that is similar to that shown in FIG. 2. However, there is provided a journal 48 which that a centering journal 49 with a cylindrical outer face 57. On the centering journal 49, there is positioned a ring 50 including a cylindrical bore 51 and a first counter face 52 in the form of a conical outer face, with the first counter face 52 being tapered toward the free end of the journal 48. The receiving bore is followed by a bore 55 accommodating a centering ring 53, which includes a cylindrical outer face 54 and a first conical face 56 in the form of a conical inner face, with the first conical face 56 contacting the first counter face 52 of the ring 50. Because the first conical face 56 and the first counter face 52 are formed by separate rings 50, 53, these can be easily exchanged when worn without the journal 48 of the roll having to be re-machined or the entire coupling sleeve having to be replaced.

Figure 4:
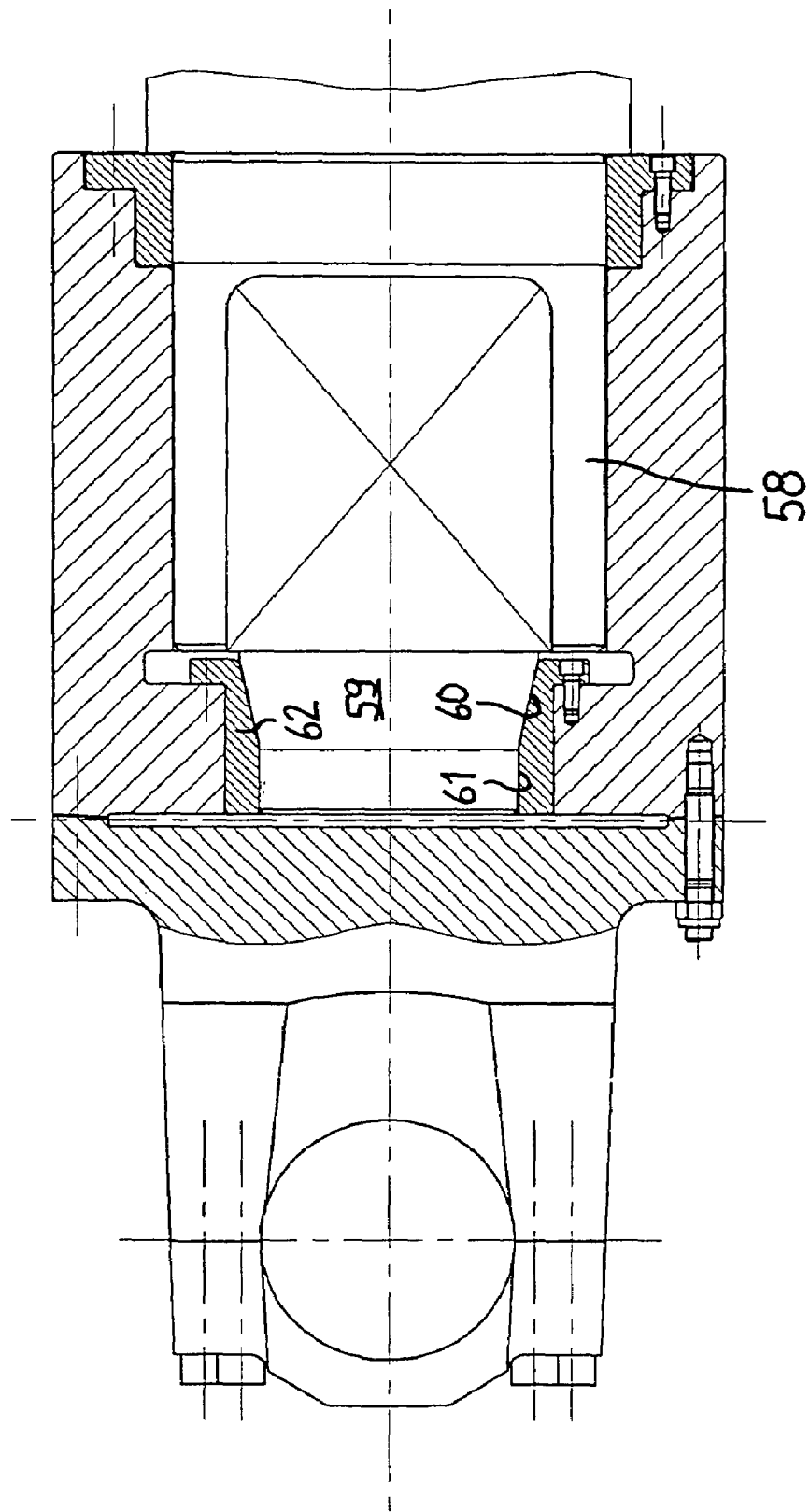
FIG. 4 is an enlarged sectional elevational view through a coupling sleeve similar to FIG. 2, wherein the centering journal of the roll journal includes a cylindrical centering projection.

FIG. 4 shows a coupling assembly that is similar to that shown in FIG. 2, wherein the journal 58 includes a centering journal 59 that, starting from a journal 58, includes a first counter face in the form of a conical outer face portion 60, with the latter changing towards the free end of the centering journal 59 into a cylindrical outer face portion 61. The first conical face portion 60 and the cylindrical outer face portion 61 contact a correspondingly designed ring 62, which is connected to the coupling sleeve. The cylindrical outer face 61 ensures a defined radial support.

Figure 5:
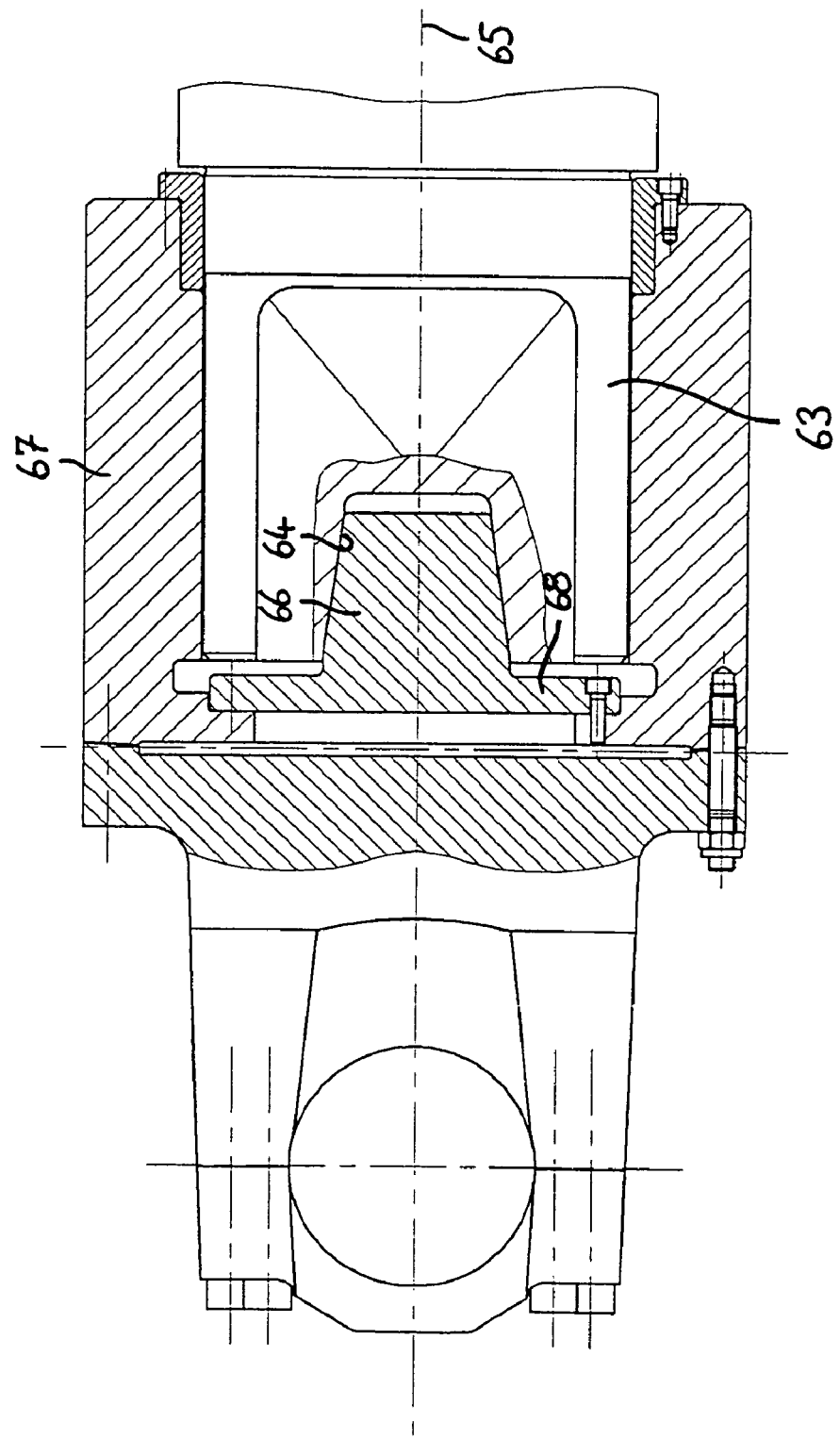
FIG. 5 is an enlarged sectional elevational view through a coupling sleeve of a second embodiment of a universal joint shaft having a conical centering projection that is connected to the coupling sleeve.

FIG. 5 shows a coupling assembly that is an alternative embodiment to that shown in FIG. 2. The journal 63 includes a first counter face 64 formed by a central conical centering bore, with the centering bore being arranged co-axially relative to a longitudinal axis 65 of the coupling sleeve 67. Furthermore, there is provided a first conical face 66 that is connected via a flange 68 to the coupling sleeve 67. The first conical face 66 is formed by a truncated cone and engages the centering bore.

Figure 6:
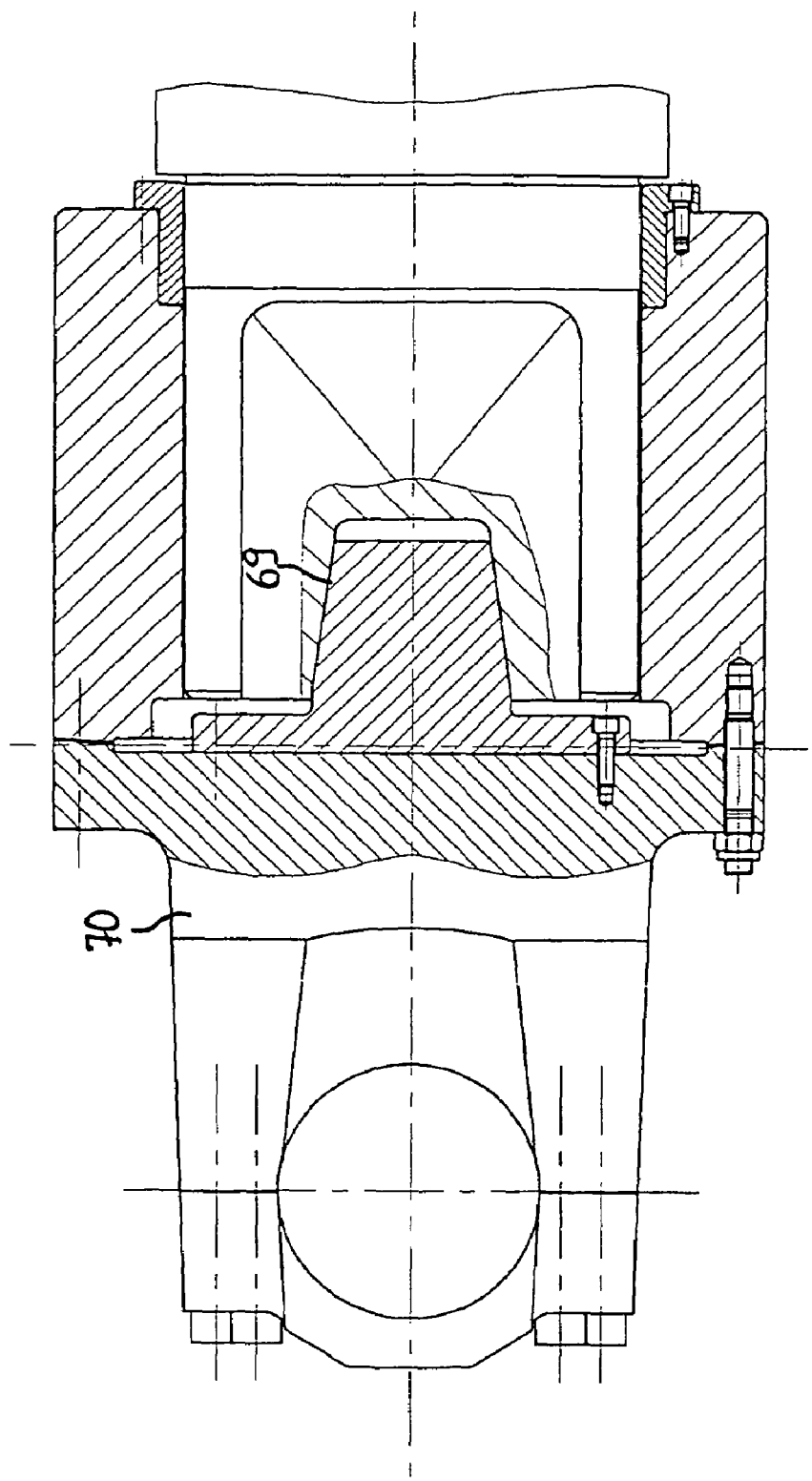
FIG. 6 is an enlarged sectional elevational view through a coupling sleeve similar to FIG. 5, wherein the centering projection is connected to the first universal joint.

FIG. 6 shows a coupling assembly that is similar to that shown in FIG. 5, with there being provided a first conical face 69 in the form of a centering projection which is not connected to the coupling sleeve, but to a joint yoke 70 of the first universal joint.

Figure 7:
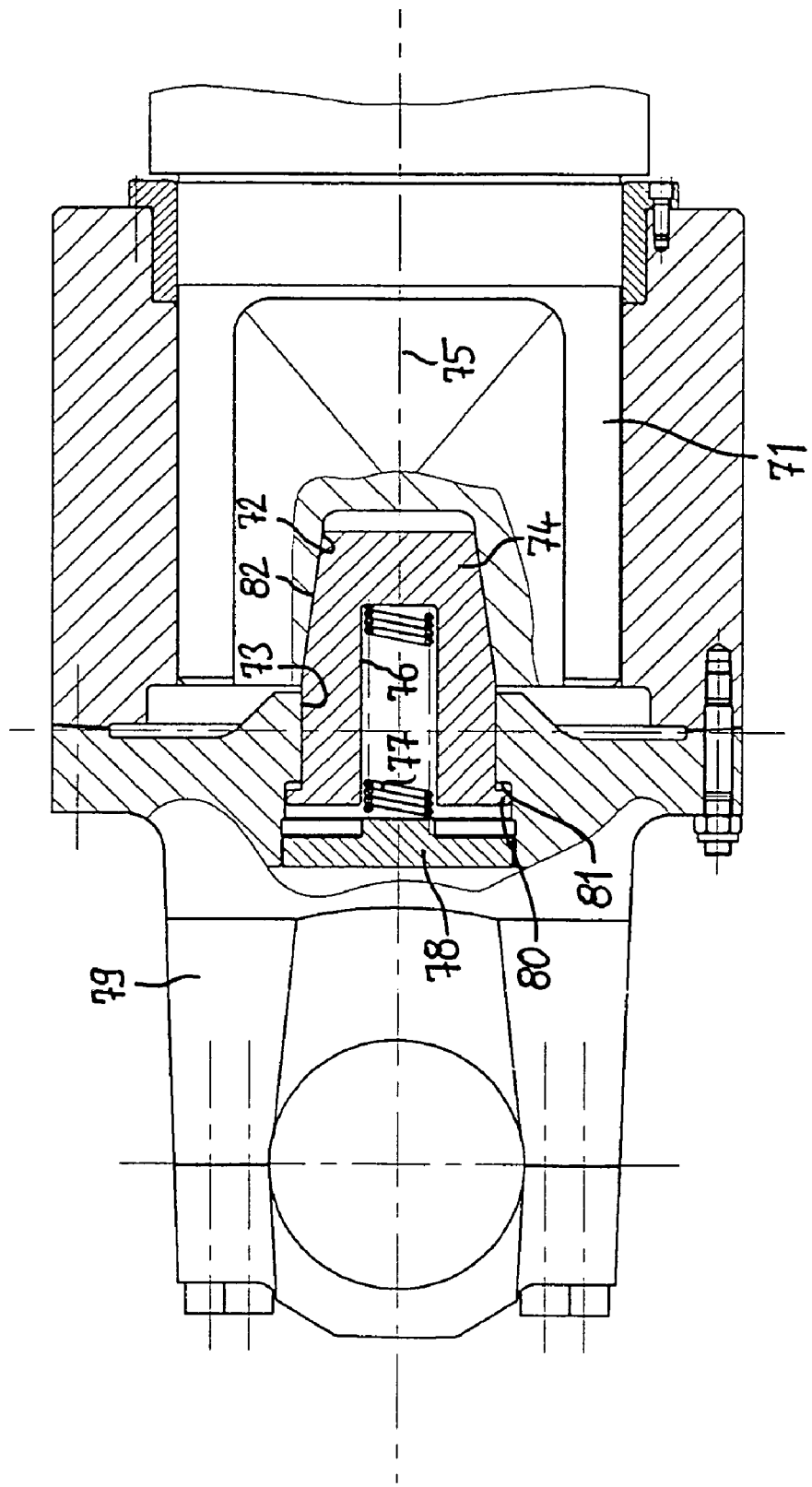
FIG. 7 is an enlarged sectional elevational view through a coupling sleeve similar to FIG. 5, wherein the centering projection is axially displaceable.

FIG. 7 shows a coupling assembly similar to that illustrated in FIG. 6. The journal includes a first counter face 72 in the form of a central centering bore that is arranged co-axially relative to a longitudinal axis 75 and is open toward the free end of the journal 71. The first counter face 72 is tapered, starting from the free end of the journal. In a joint yoke 79 of the first universal joint, there is provided a central bore 73 that is arranged co-axially relative to the longitudinal axis 75 and that is positioned opposite the first counter face 72. A centering projection 74 is arranged in the bore 73 so as to be axially displaceable along the longitudinal axis 75. The centering projection 74 includes a conical outer face that forms a first conical face 82 and by means of which the centering projection 74 is held in contact with the wall of the centering bore 72. In the centering projection 74, there is provided a central bore 76 that is open toward the joint yoke 79. The bore 76 contains a pressure spring 77 that is supported against a base plate 78 on the one hand and against the centering projection 74 on the other hand. As a result, the centering projection 74 is loaded toward the journal 71 so that it is ensured that the centering projection 74 is held in the centering bore 72 and that a radial play is pressed out. At its end facing away from the journal 71, the centering projection 74 includes a continuous collar 80 that, in a maximum pushed-out position of the centering projection 74, comes to rest against a circular-ring-shaped contact face 81. In this way, it is ensured that if the coupling sleeve has to be removed from the journal, the centering projection 74 is held at the joint yoke 79.

Figure 8:
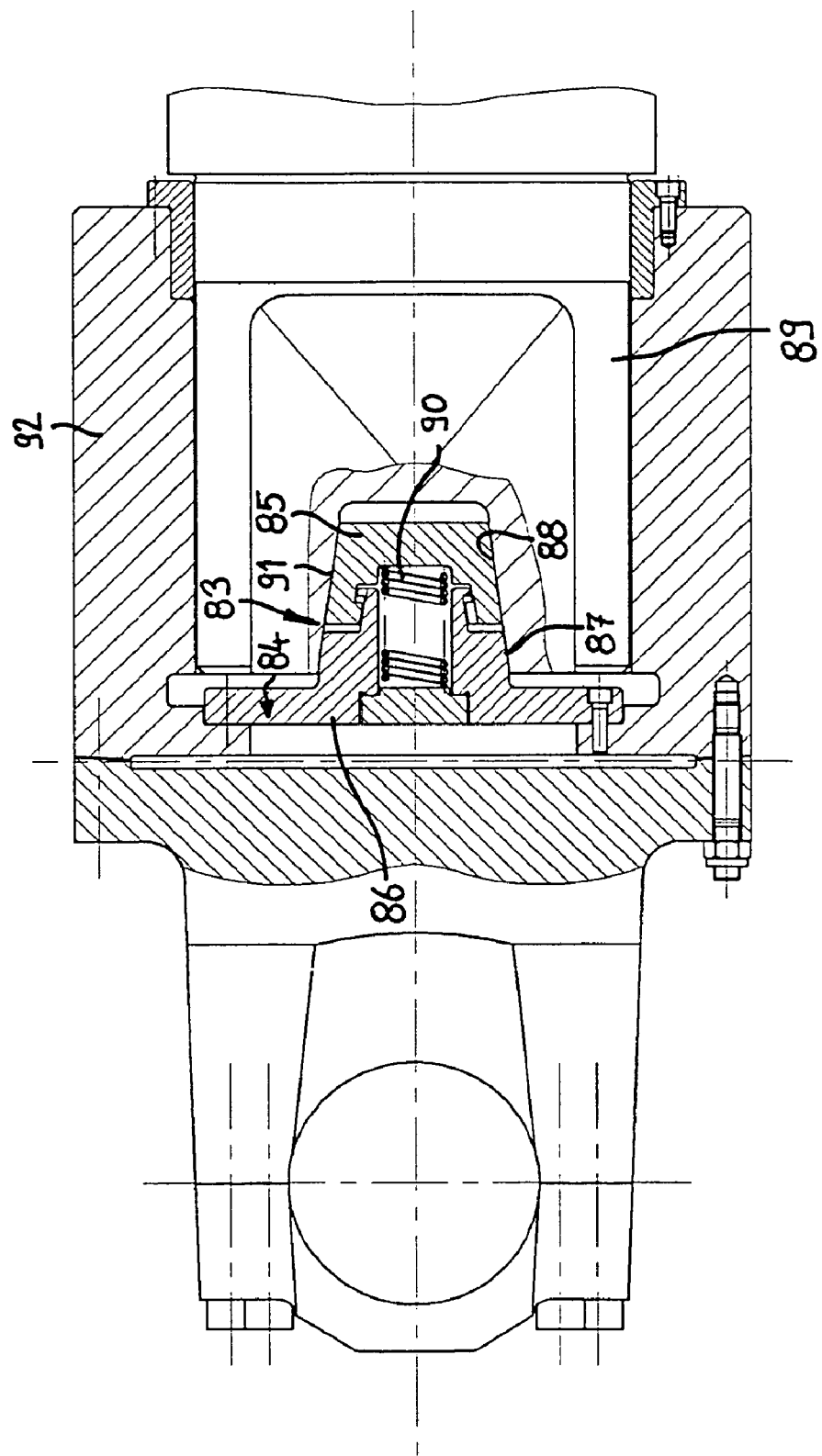
FIG. 8 is an enlarged sectional elevational view through a coupling sleeve similar to FIG. 5, wherein the centering projection includes a base part and a centering part.

FIG. 8 shows a coupling assembly that is similar to that illustrated in FIG. 5. Again, there is provided a centering projection 83 that is connected to a coupling sleeve 92. The centering projection 83 includes a base part 84 and a centering part 85. The base part 84 is provided with a flange 86 by means of which it is connected to the coupling sleeve 92. Furthermore, the base part 84 includes a portion with a conical outer face 87 which faces a journal 89. The centering part 85 is axially displaceably arranged in the base part 84. The centering part 85 includes an outer face that is also conical and which forms the first conical face 91. The two conical outer faces 87, 91 are held in contact with a conical centering bore in the journal 89, with the conical centering bore forming the first counter face 88. A pressure spring 90 is supported against the base part 84 on the one hand and against the centering part 85 on the other hand, so that the centering part 85 is securely held in the centering bore.

Figure 9:
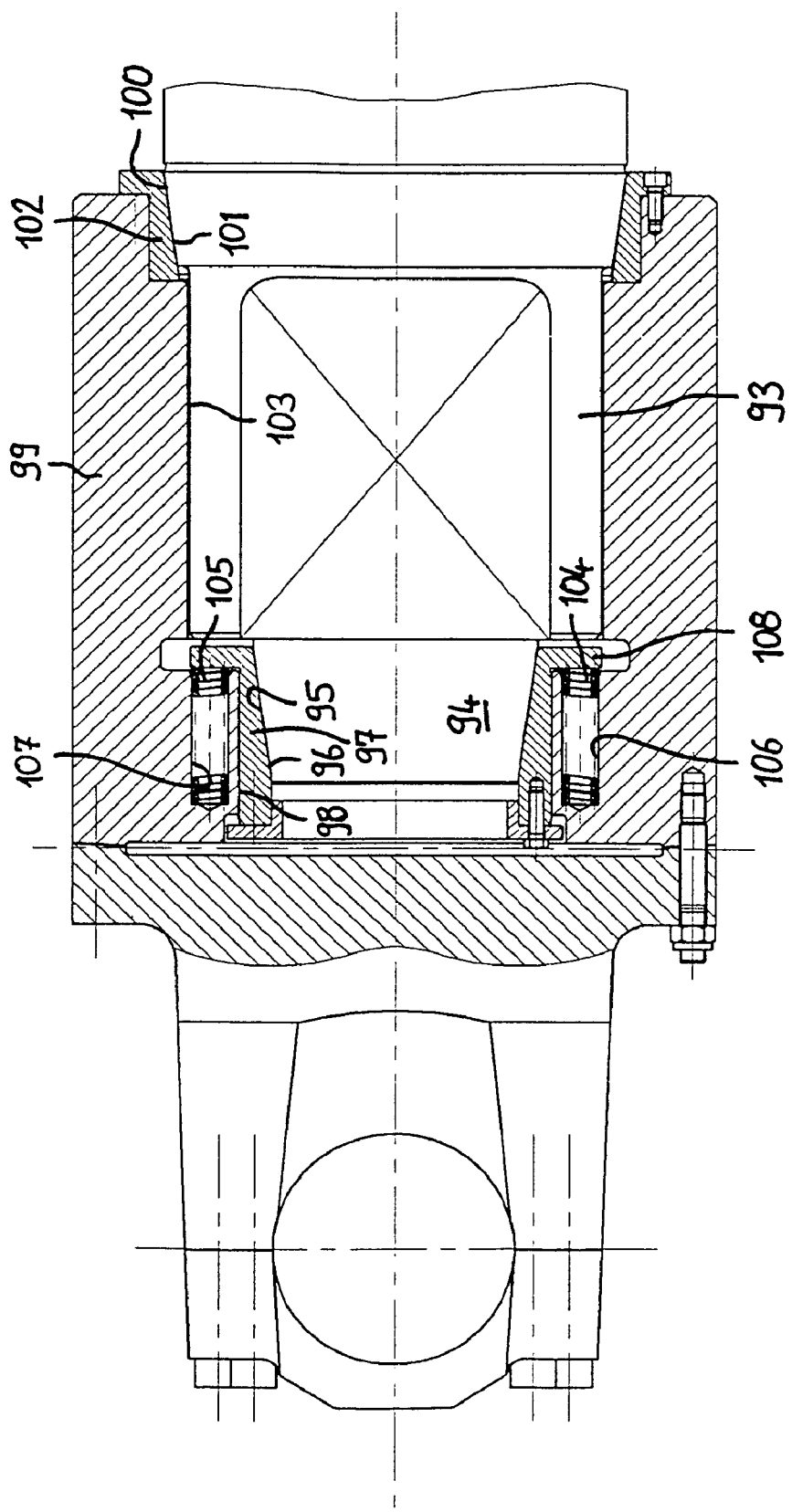
FIG. 9 is an enlarged sectional elevational view through a coupling sleeve similar to FIG. 2, wherein there is provided a second conical face and wherein the first conical face is shown in the form of a spring-loaded centering ring.

FIG. 9 shows an assembly that is similar to that shown in FIG. 2. There is provided a journal 93 that includes a conical centering journal 94. The latter includes a first counter face 95 that is tapered toward the free end and that is in contact with a first conical face 96 of a centering ring 97. The centering ring 97 is positioned in a cylindrical bore 98 of a coupling sleeve 99. At its end facing the roll, the journal 93 includes a second counter face 100 in the form of a conical outer face that widens towards the roll. The second counter face 100 is in contact with a correspondingly designed second conical face 101 of a ring 102 that is inserted into the receiving bore 103 of the coupling sleeve 99. Consequently, the journal 93 is held in a defined way both at its free end and at its end facing the roll. In order to avoid over-determination, the centering ring 97 is guided axially displaceably in the centering bore 98. Furthermore, there are provided pressure springs 104, 105 that are supported against the coupling sleeve 99 on the one hand and against the centering ring 97 on the other hand, loading the latter into contact with the outer face 95 of the centering journal 94. The pressure springs 104, 105 are guided in axial bores 106, 107 and are supported against a circular-ring-shaped collar 108 of the centering ring 97.

Figure 10:
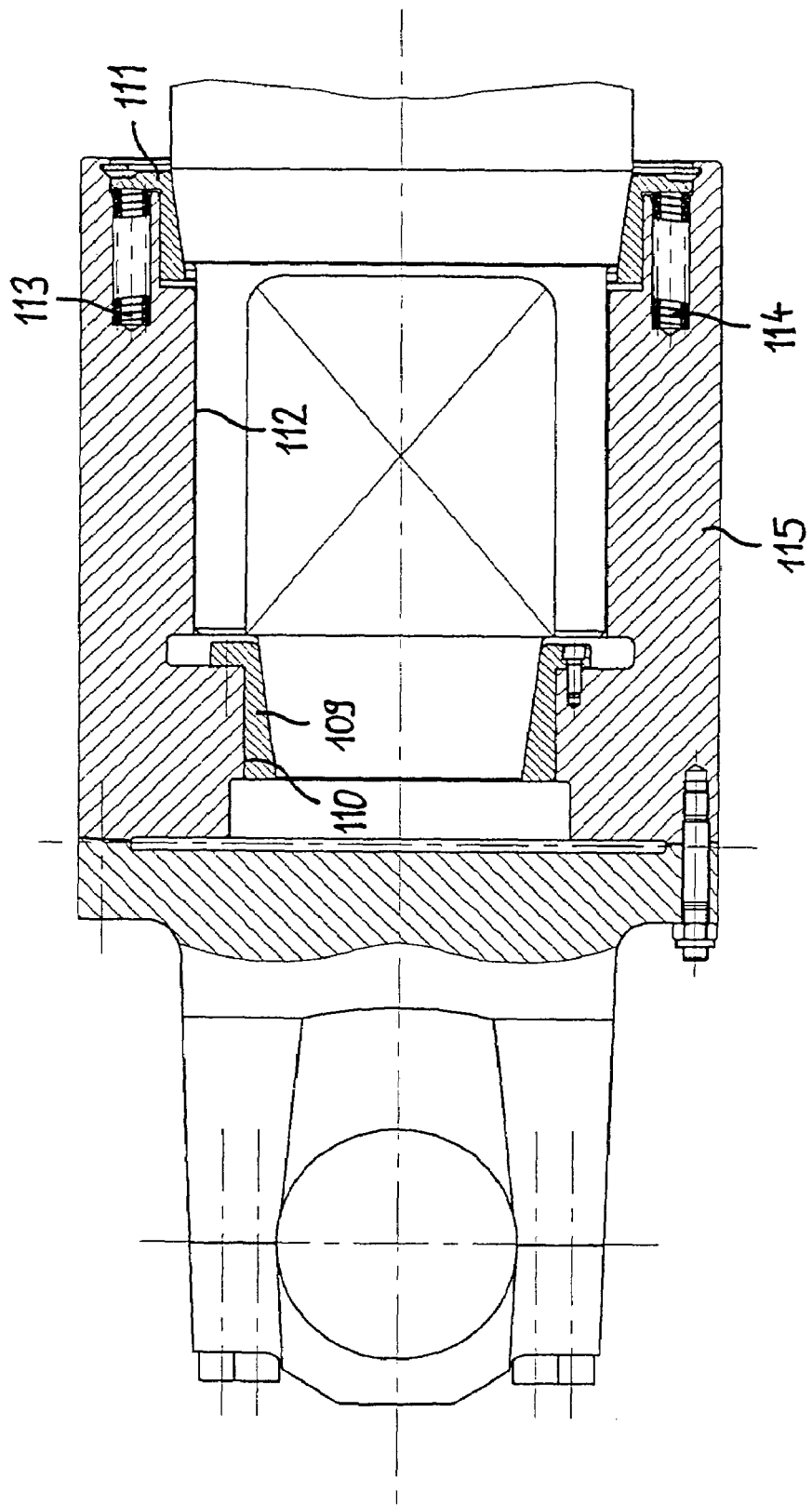
FIG. 10 is an enlarged sectional elevational view through a coupling sleeve similar to FIG. 9, wherein the second conical face is provided in the from of a spring-loaded ring.

FIG. 10 shows an assembly that is similar to that shown in FIG. 9, but there is provided a centering ring 109 that is firmly positioned in the centering bore 110. Furthermore, there is provided a ring 111 that is axially displaceably guided in a receiving bore 112, with pressure springs 113, 114 being supported against a coupling sleeve 115 on the one hand and against the ring 111 on the other hand. In FIGS. 9 and 10, the conical outer faces at the journal, which are comparable to those in the assemblies according to FIG. 3, can be provided in the form of rings that include a cylindrical bore by means of which they are positioned on the journal and form a conical outer face.

The coupling assemblies according to FIGS. 7 and 8 are additionally advantageous in that the pressure springs provided therein can serve as means by which the first conical face is loaded along the longitudinal axis towards the roll. In these embodiments, a separate spring in the plunging unit of the connecting shaft does not necessarily have to be provided.

Figure 11:
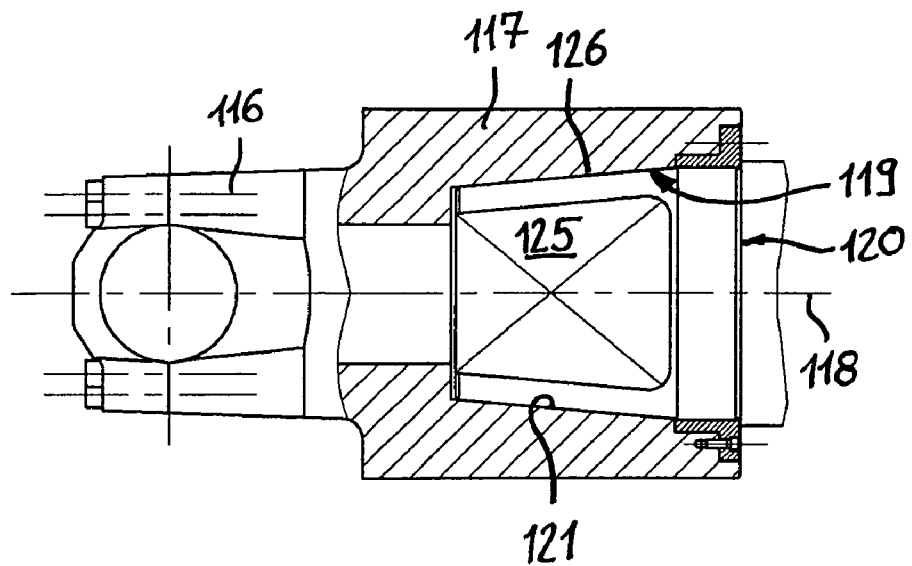
FIG. 11 is a sectional elevational view through a coupling sleeve of a third embodiment of a universal joint shaft with a conical receiving bore.
Figure 12:
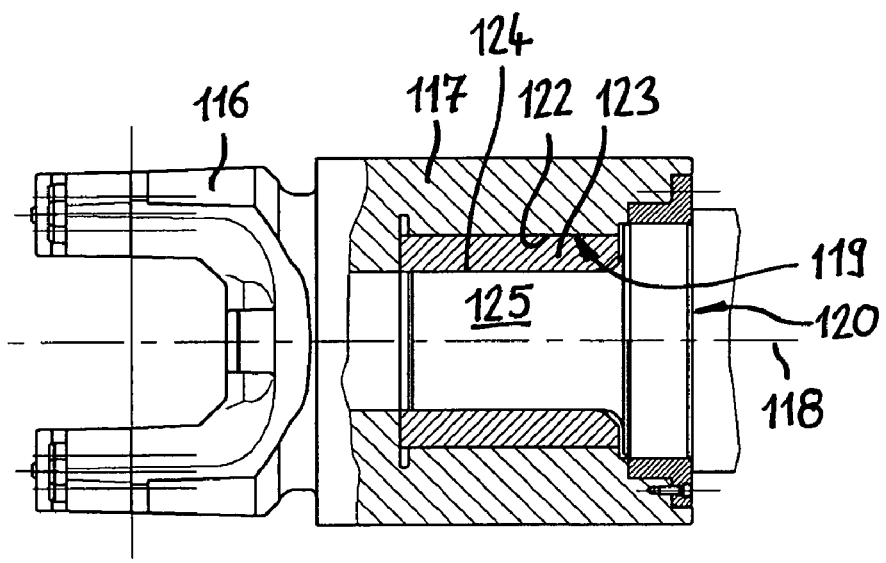
FIG. 12 is a further sectional elevational view through a coupling sleeve according to FIG. 11.

FIGS. 11 and 12 show a further embodiment of a coupling sleeve and will be described jointly below.

A second driveshaft 116 of a first universal joint of the universal joint shaft is produced so as to be integral with a coupling sleeve 117. The coupling sleeve 117 includes a receiving bore 119 that is arranged co-axially relative to a longitudinal axis 118 of the coupling sleeve 117 and that starts from an opening 120 that faces away from the joint yoke 116. The receiving bore 119 includes a conical inner face 121 that is tapered towards the joint yoke 116, starting from the opening 120. Around the circumference of the inner face 121, there are formed parallel, diametrically opposed transmitting faces 122 for transmitting torque. Conical portions 126 of the inner face 121 form the first conical face. Between the transmitting faces 122 and correspondingly designed faces 124 of the journal 125, there are arranged pressure plates 123. Because both the conical portions 126 and the transmitting faces 122 are arranged around the circumference of the inner face 121 of the receiving bore 119, the coupling sleeve 117 can be relatively short, since there is no need for a separate centering bore which receives a centering journal of the journal.

Figure 13:
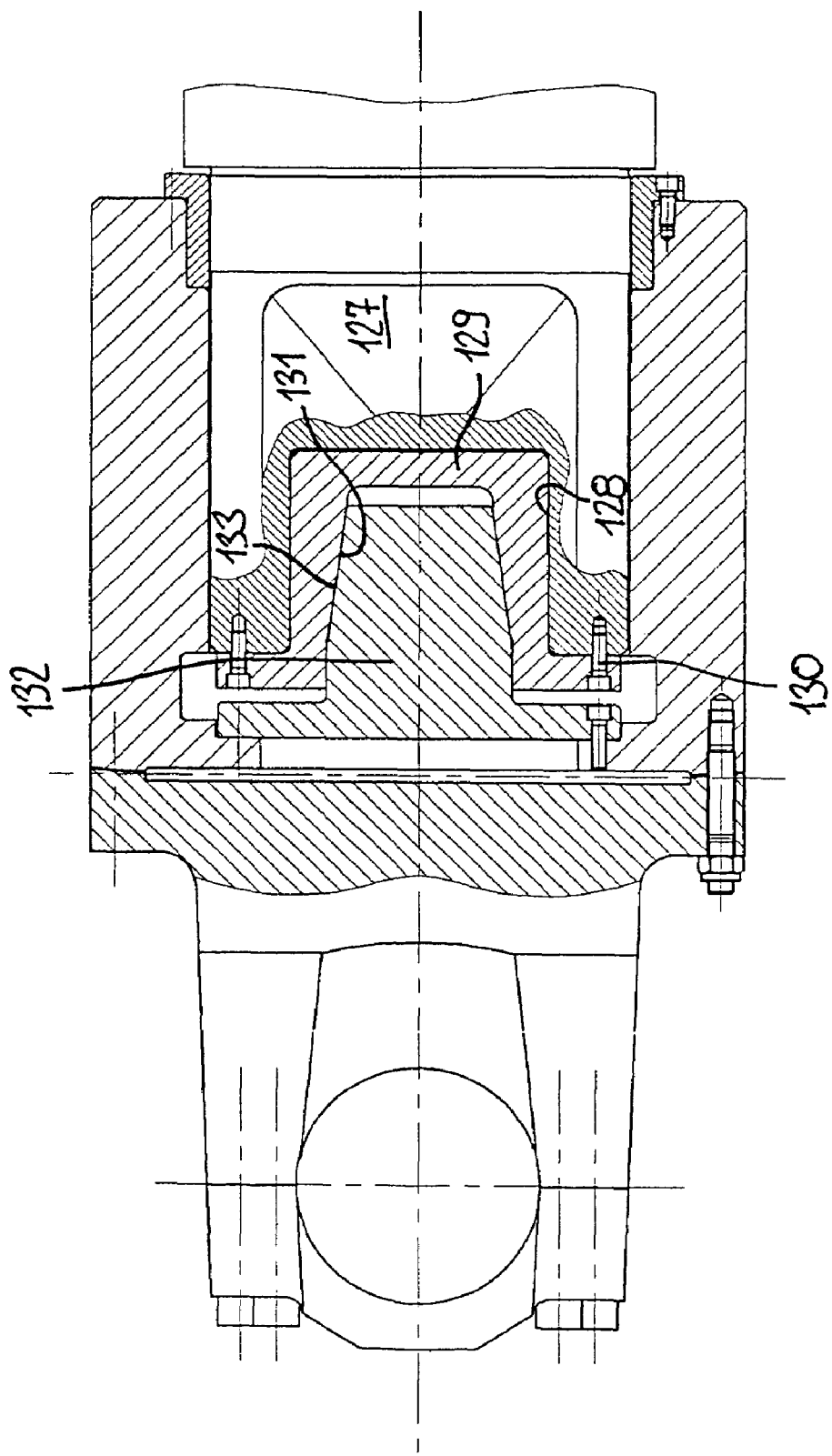
FIG. 13 is an enlarged sectional elevational view through a coupling sleeve similar to FIG. 5, wherein the first counter face is shown in the form of bush.

FIG. 13 shows a coupling sleeve that is similar to that shown in FIG. 5, wherein the journal 127, starting from its free end, includes a cylindrical bore 128 into which there is inserted a bush 129. The bush 129 is secured via bolted connections 130 to the journal 127. The bush 129 includes a first counter face 131 in the form of a conical centering bore that is entered by a centering projection 132, with the centering projection 132 forming a first conical face 133. The advantage of this embodiment is that existing rolls with journals 127 can be modified in such a way that they include a first counter face 131 that is held in contact with the first conical face 133.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A universal joint shaft, comprising:
    a connecting shaft;
    a first universal joint that is attached to a first end of the connecting shaft;
    a second universal joint that is attached to a second end of the connecting shaft; and
    a coupling sleeve that defines a longitudinal axis and that is connected to the first universal joint, the coupling sleeve including a receiving bore with an opening for receiving a journal of a roll, wherein the receiving bore forms transmitting faces for transmitting torque, and wherein the coupling sleeve includes a ring having a cylindrical bore that is provided in the region of the opening for supporting the journal against the cylindrical bore by means of a correspondingly shaped cylindrical outer face, the cylindrical bore beginning at the opening of the receiving bore and extending completely throughout the entire axial length of the ring, and wherein the coupling sleeve includes a first conical face that is arranged concentrically relative to the longitudinal axis and remote from the opening and which is provided for contacting a correspondingly designed first counter face at the journal of the roll in order to avoid radial play, as well as means which force-load the first conical face along the longitudinal axis towards the roll.

2. A universal joint shaft according to claim 1, characterized in that the means that force-load the first conical face along the longitudinal axis towards the roll are provided in the form of a spring means.

3. A universal joint shaft according to claim 2, characterized in that the spring means are arranged in a plunging unit of the connecting shaft.

4. A universal joint shaft according to claim 1, characterized in that there is provided a centering bore that starts from the receiving bore and is arranged co-axially relative to the longitudinal axis and which comprises an inner face that conically widens towards the receiving bore and which contacts a correspondingly designed centering journal of the roll.

5. A universal joint shaft according to claim 4, characterized in that the centering bore forms part of a centering ring that is inserted into a cylindrical bore of the coupling sleeve.

6. A universal joint shaft according to claim 1, characterized in that in the receiving bore, there is provided a truncated-cone-shaped centering projection that extends co-axially relative to the longitudinal axis and whose outer face is tapered towards the aperture of the receiving bore and is provided for contacting a correspondingly designed inner face of a centering bore of the journal of the roll.

7. A universal joint shaft according to claim 6, characterized in that there are provided spring means by means of which the centering projection is loaded towards the journal.

8. A universal joint shaft according to claim 6, characterized in that the centering projection includes a base part that is fixed to the coupling sleeve or to the first universal joint and that includes a conical outer face for contacting the counter face, and that the centering projection includes a centering part that, by means of spring means supported against the base part and the centering part, is loaded toward the journal and that includes a conical outer face for contacting the counter face.

9. A universal joint shaft according to claim 1, characterized in that the first conical face is provided in the form of a closed face arranged around the longitudinal axis.

* * * * *